No. 868,415. PATENTED OCT. 15, 1907.
C. DE ALBERTIS.
SELF CLOSING GAS TAP OR VALVE.
APPLICATION FILED SEPT. 25, 1906.
3 SHEETS—SHEET 1.
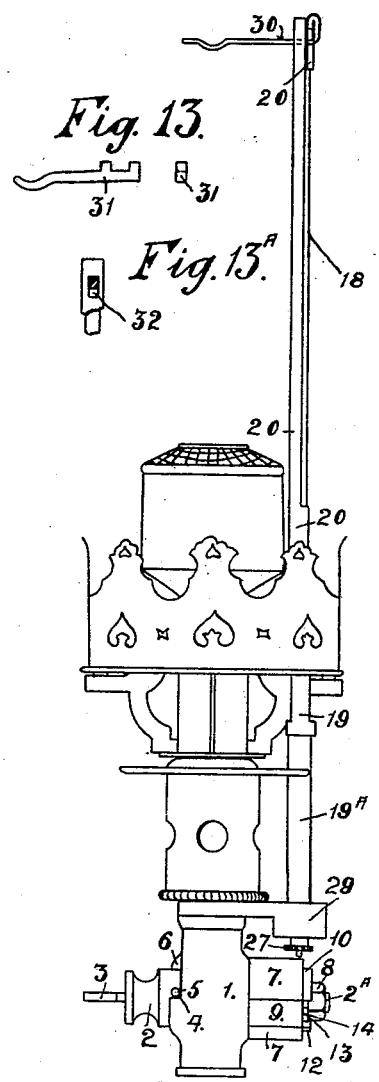
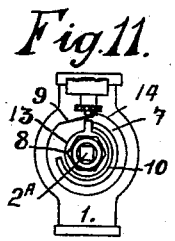
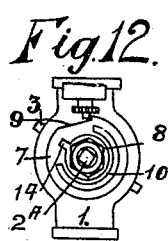
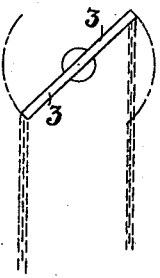
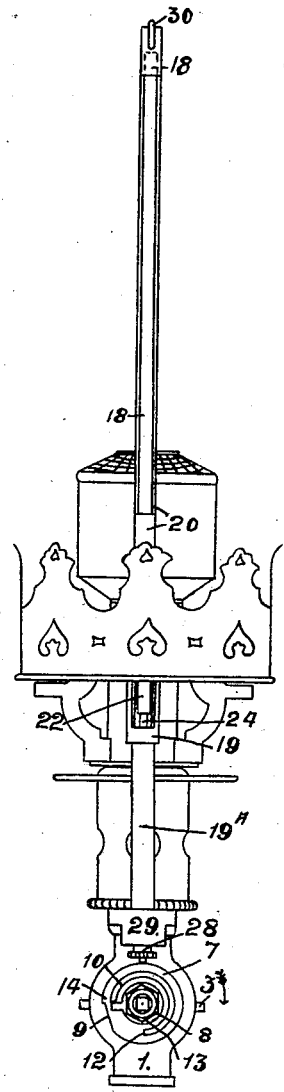
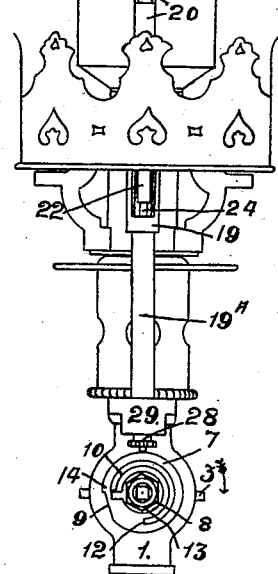
WITNESSES
W. P. Burke
H. H. Sierichs.
INVENTOR
Claude De Albertis
By Richardson
ATTYS No. 868,415. PATENTED OCT. 15, 1907.
C. DE ALBERTIS.
SELF CLOSING GAS TAP OR VALVE.
APPLICATION FILED SEPT. 25, 1906.
3 SHEETS—SHEET 2.
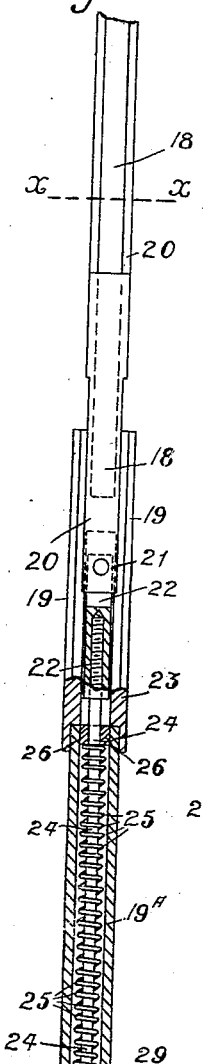
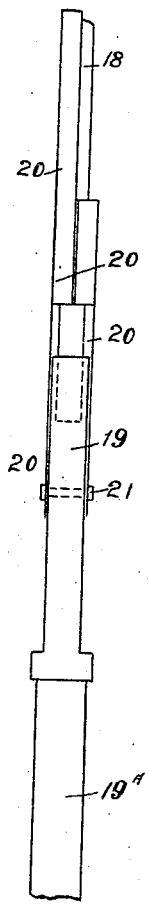
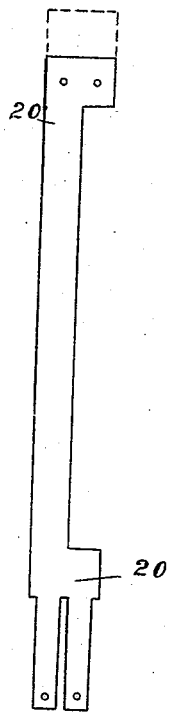
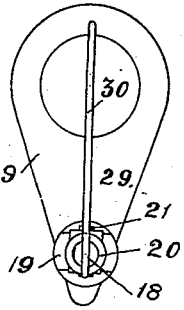
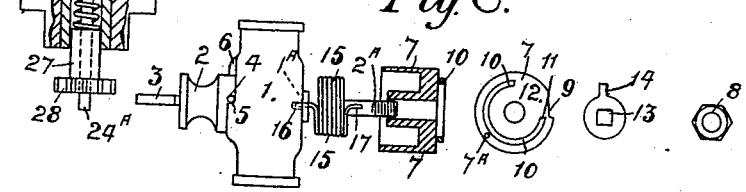
WITNESSES
W. P. Burke
H. W. Sierichs
INVENTOR
Claude De Albertis
BY Richards
ATTY'S No. 868,415. PATENTED OCT. 15, 1907.
C. DE ALBERTIS.
SELF CLOSING GAS TAP OR VALVE.
APPLICATION FILED SEPT. 25, 1906.

3 SHEETS—SHEET 3.

WITNESSES
W. P. Burke
H. W. Sierichs

INVENTOR
Claude De Albertis
BY Richardson
ATTYS.

THE NORRIS PETERS CO., WASHINGTON, D. C.

UNITED STATES PATENT OFFICE.

CLAUDE DE ALBERTIS, OF LIVERPOOL, ENGLAND.

SELF-CLOSING GAS TAP OR VALVE.

No. 868,415.

Specification of Letters Patent.

Patented Oct. 15, 1907.

Application filed September 25, 1906. Serial No. 336,135.

*To all whom it may concern:*

Be it known that I, CLAUDE DE ALBERTIS, a subject of the King of Italy, and a resident of 10 Elizabeth street, Liverpool, in the county palatine of Lancaster, England, civil engineer, have invented certain new and useful Improvements in or in Connection with Self-Closing Gas Taps or Valves, of which the following is a specification.

This invention has reference to thermostatic appliances whereby if the flame of a gas or vapor burner be blown out, or go out from any cause, such as the gas being turned off at the meter, the tap shall close automatically, and thus the great cause of accidents due to gas escaping from an unlighted burner is avoided.

The object of the present invention is to provide improvements in and in connection with such appliances which are more particularly applicable to incandescent gas lamps.

My invention consists of novel features and parts and combinations of the same, as will be more fully described hereinafter and then pointed out in the claims.

Practical embodiment of the invention is represented in the accompanying drawings, forming a part of this specification, in which similar figures of reference denote like and corresponding parts in all the views.

Figure 14:
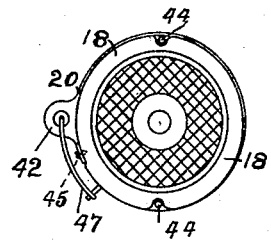
Figure 17:
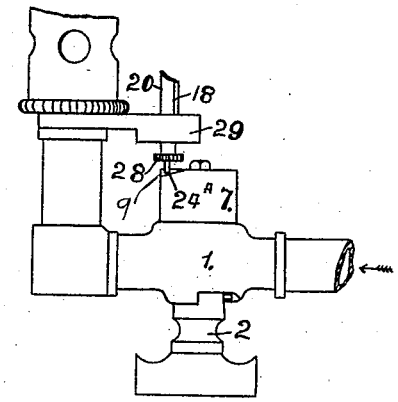
Figure 15:
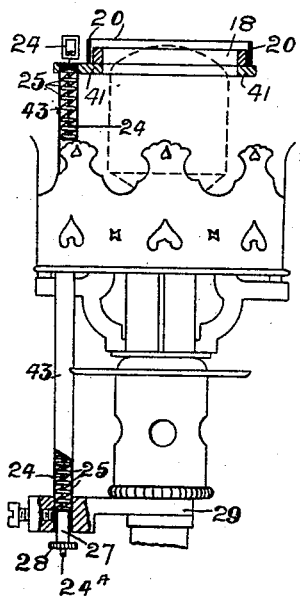
Figure 18:
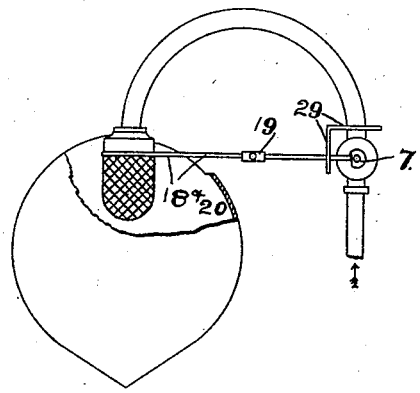
Figure 16:
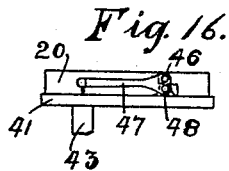

Figures 1 and 2 are elevations, (at right angles to each other) of an incandescent gas lamp provided with a safety device embodying this invention. Fig. 3 is an enlarged view, partly in section, and Fig. 4 is a plan of the thermostatic elements and some of the parts connected therewith. Fig. 5 is a section taken as on line X—X, Fig. 3. Fig. 6 is an elevation of the thermostatic elements, and some of the parts connected therewith, taken at right angles to Fig. 3. Fig. 7 shows one of the thermostatic elements prior to being fitted. Fig. 8 illustrates the gas cock, and elements forming part thereof, detached. Fig. 9 is a diagram showing the angle or inclination of the cock actuating lever (closed or full open) when operated by chains. Figs. 10 to 12 inclusive illustrate the gas cock and parts adjacent thereto, in different positions. Figs. 13 and 13$^A$ illustrate a modified construction of mantle support. Fig. 14 is a plan. Fig. 15 is a part sectional elevation and Fig. 16 is an elevation, illustrating, more or less in diagram, a modified mode of applying my invention to an incandescent gas lamp. Fig. 17 illustrates a modified arrangement of gas cock. Fig. 18 is a diagram illustrating the manner in which my invention may be applied to an inverted incandescent gas lamp.

Referring now more particularly to Figs. 1 to 13$^A$, 1 represents generally the body of the cock, 2 is the plug and 3 the handle; 4 is a pin on plug 2, which pin engages with one or other of the stops 5 and 6 when the cock is closed, and full open.

7 represents a barrel or hollow washer slipped loosely over the screwed end 2$^A$ of plug 2, being secured by nut 8.

9 indicates a part cut out of the barrel 7, and 10 is a shoulder formed on the barrel in the slot between the ends or stops 11 and 12 of which the projection or pin 14 of the washer or plate 13 is adapted to traverse.

15 is a spiral spring, one end 16 of which fits into a recess or socket 1$^A$ drilled for its reception in the body 1 of the cock, while the other end 17 fits into a recess or socket 7$^A$ of barrel 7. (See Fig. 8.) This spring controlled barrel 7 has a tendency to instantly close the cock when it is opened; thus, if the handle 3 of plug 2 be turned in the direction of the arrow shown in Fig. 2, the barrel 7 will also be turned from this closed position, and against the resistance of spring 15,— by the nib 14 of plate 13, which nib will engage with the end or stop 11 of shoulder 10,—until the pin 4 engages with stop 6 on the body 1 when the cock is fully opened. If, however, it is desired to close, wholly or in part, the cock by hand when the barrel 7 is locked, this may be effected by turning the handle 3 of the cock—see Fig. 12.

18 represents a stick of chalk or other fire resisting substance fitting into a socket in the upper part of the brass holder 19, which latter, in turn, is suitably secured to the sleeve 19$^A$ (or holder 19 and sleeve 19$^A$ may be in one piece) the lower end fitting into a bridge 29, by means of which the thermostatic devices, as a whole, are supported adjacent to the flame.

20 is an expansion strip, say, of German silver, partially surrounding the chalk rod 18, which strip is secured by a rivet 21 to a rectangular brass block 22 fitting within the rectangular cavity 23 cut in 19. 24 is a steel rod screwed into the block 22 and encircled by a spiral spring 25 disposed in the sleeve 19$^A$ between the upper plug 26 and the lower cylindrical part 27, which latter fits tightly on the rod 24, and is provided with a toothed or serrated ring 28 at its lower part, by the rotation of which the rod 24 may be raised or lowered—*i. e.* adjusted in relation to barrel 7—as desired.

30 represents a platinoid rod from which the gas mantle is suspended.

In some cases it may be found desirable to substitute a fire clay rod 31 for the platinoid rod 30, which rod 31 will be passed through the slot 32 in 20. (See Figs. 13 and 13$^A$.)

In use, assuming the gas cock to be closed as shown, say, in Figs. 1 and 2, it is rotated, against the resistance of spring 15, until the parts assume the position shown in Fig. 10, a light is now applied to the burner (the user still holding the cock open) whereupon the German silver strip 20, being heated, expands and causes, through its connection with rod 24, the end 24$^A$ of said rod to almost instantaneously move down into the slot 9, and hold the cock open, as shown in Fig. 11. The cock may, however, be partially or entirely closed by hand (Fig. 12) during the time the end 24^A is in engagement with 7.

When, due to any cause, the light is extinguished, the strip 20, in cooling, contracts, and the point 24^A of rod 24 moves upwards out of the slot 9, and the cock, being released, flies back to its closed position under the influence of spring 15.

Referring now to the construction shown in Figs. 14 to 16, the thermostatic devices are disposed horizontally around the burner. 41 represents a metallic ring, say, of iron or steel, provided with a boss 42 to which is connected a tube 43; 18 is a chalk ring and 20 an expansion strip, say, of German silver. The ring 18 is maintained on the ring 41 by means of the projections 44. The periphery of the ring of chalk 18 may be slightly "waved" or corrugated for the purpose of allowing the expansion strip 20 to quickly heat and cool, by reducing its area of contact with the ring 18.

One end of the expansion strip 20 is attached to the metal ring 41 at 45 by a screw supported in a vertical bracket; while the other end is connected at 46 to a lever 47 pivoted at 48 to a bracket connected with ring 41.

The expansion of the strip 20 on heating will cause the lever 47 to move downwards and so lock the cock.

Referring to Fig. 17, the slot 9 is formed on the face of 7 in lieu of the periphery, as shown in Figs. 1 to 12.

In the arrangement illustrated in Fig. 18 the thermostatic device is placed at the base of the mantle.

My invention may, suitably modified, be applied to gas cookers and stoves.

Having now described my invention, what I claim as new, and desire to secure by Letters Patent is:

1. In combination, a thermostat comprising a rod and an expansion strip partially surrounding said rod, a gas mantle supporting arm connected with said strip, a rod holder, a block to which said expansion is connected, a slot in said rod holder in which said block is adapted to fit, a rod adustable in relation to said block, a self closing gas cock, and a spring adapted to expedite the engagement of the thermostat with said gas cock.

2. In combination, a gas cock, a barrel adapted to fit loosely on the plug of said cock, stops on said barrel, a pin rigidly connected with said plug, and adapted to engage with the cock body and the other end with said barrel, a thermostat comprising a rod and an expansion strip partially surrounding said rod, a gas mantle supporting arm connected with said strip, a rod holder, a block to which said expansion strip is connected, a slot in said holder in which said block is adapted to fit, a rod adjustable in relation to said block and the barrel of said gas cock, and a spring adapted to expedite the engagement of the end of said rod with said cock barrel.

3. In combination, a gas cock, a barrel adapted to fit loosely on the plug of said cock, stops on said barrel, a pin rigidly connected with said plug and adapted to engage with said stops, a helical spring, one end of which is connected with the cock body and the other end with said barrel, a thermostat comprising a rod and an expansion strip partially surrounding said rod, a gas mantle supporting arm connected with said strip, a rod holder, a rectangular block to which said expansion strip is connected, a rectangular slot in said rod holder in which said block is adapted to fit, a rod screwed into said block, a casing within said casing between a plug at the upper part and a head or enlargement on said rod, means by which said rod may be rotated, and a bracket secured to the "burner" and upon which the thermostatic devices as a whole are supported.

4. In combination, a gas cock, a barrel adapted to fit loosely on the plug of said cock, stops on said barrel a pin rigidly connected with said plug and adapted to engage with said stops, a spring, one end of which is connected with the cock body and the other end to said barrel, a thermostat comprising a horizontally disposed ring of fire resisting material and an expansion strip of German silver, a metal supporting ring, means whereby one end of said expansion strip connected with said metal ring, a lever connected with the other end of said expansion strip, and a rod adapted to be moved vertically through the expansion and contraction of said strip, the lower end of said rod being adapted to engage with and lock said cock barrel.

In testimony whereof I have signed my name to this specification in the presence of two subscribing witnesses.

CLAUDE DE ALBERTIS.

Witnesses:
H. WATSON,
JOHN H. WALKER.